US011390148B2

(12) United States Patent
Van Boxtel et al.

(10) Patent No.: US 11,390,148 B2
(45) Date of Patent: Jul. 19, 2022

(54) ROLLO ASSEMBLY AND OPEN ROOF CONSTRUCTION PROVIDED THEREWITH

(71) Applicant: Inalfa Roof Systems Group B.V., Oostrum (NL)

(72) Inventors: Eduardus Christianus Henricus Van Boxtel, Zeeland (NL); Jur Johannes Maria Custers, Lottum (NL); Peter Christiaan Leonardus Johannes Manders, Horst (NL); Marcel Johan Christiaan Nellen, Merselo (NL)

(73) Assignee: Inalfa Roof Systems Group B.V., Oostrum (NL)

( * ) Notice: Subject to any disclaimer, the term of this patent is extended or adjusted under 35 U.S.C. 154(b) by 0 days.

(21) Appl. No.: 16/579,152

(22) Filed: Sep. 23, 2019

(65) Prior Publication Data

US 2020/0094659 A1 Mar. 26, 2020

(30) Foreign Application Priority Data

Sep. 25, 2018 (EP) ..................................... 18196624

(51) Int. Cl.
*B60J 7/00* (2006.01)
*B60J 7/043* (2006.01)
*B60J 7/06* (2006.01)

(52) U.S. Cl.
CPC ............. *B60J 7/0015* (2013.01); *B60J 7/043* (2013.01); *B60J 7/067* (2013.01)

(58) Field of Classification Search
CPC ... B60J 7/00; B60J 7/0015; B60J 7/043; B60J 7/067

(Continued)

(56) References Cited

U.S. PATENT DOCUMENTS 4,159,144 A 6/1979 Ehlen et al.
4,298,226 A 11/1981 Mizuma
(Continued)

FOREIGN PATENT DOCUMENTS

DE 102012019078 A1 3/2013
DE 102014005476 A1 10/2015
(Continued)

OTHER PUBLICATIONS

European Search Report for corresponding European Patent Application No. 18196624.3, filed Sep. 25, 2018.

*Primary Examiner* — Dennis H Pedder
*Assistant Examiner* — Joyce Eileen Hill
(74) *Attorney, Agent, or Firm* — Steven M. Koehler; Westman, Champlin & Koehler, P.A.

(57) ABSTRACT

A rollo assembly for use in a vehicle with an opening, includes a shaft, a screen wound on/off said shaft where a forward end is provided with a beam and opposite channels guide edges of the screen and ends of the beam. Drive cables are provided with connecting members for drivingly engaging respective counter connecting members provided at ends of the beam. The shaft, beam and screen are combined into a detachable unit which, when the screen is substantially fully wound onto the shaft and the cables assume a position in which the connecting members at least partially protrude from a longitudinal end of the channels, can be moved relative to said channels for connecting or disconnecting the counter connecting members to or from the connecting members. A support maintains the connecting members of the cables, when maximally protruding from said longitudinal end of the channels, in a well-defined position.

21 Claims, 3 Drawing Sheets

(58) Field of Classification Search
USPC .................................................. 296/214, 219
See application file for complete search history.

(56) References Cited

U.S. PATENT DOCUMENTS

| | | |
|---|---|---|
| 6,428,090 B1 | 8/2002 | Reinsch |
| 9,827,836 B2 | 11/2017 | Nellen et al. |
| 2017/0158034 A1* | 6/2017 | Nellen .................... B60J 7/185 |
| 2018/0162207 A1 | 6/2018 | Pike et al. |

FOREIGN PATENT DOCUMENTS

| | | | |
|---|---|---|---|
| DE | 102015109862 A1 | 12/2016 | |
| EP | 3176016 A1 | 6/2017 | |
| WO | WO-2016107650 A1 * | 7/2016 | ............ B60J 1/2041 |

* cited by examiner

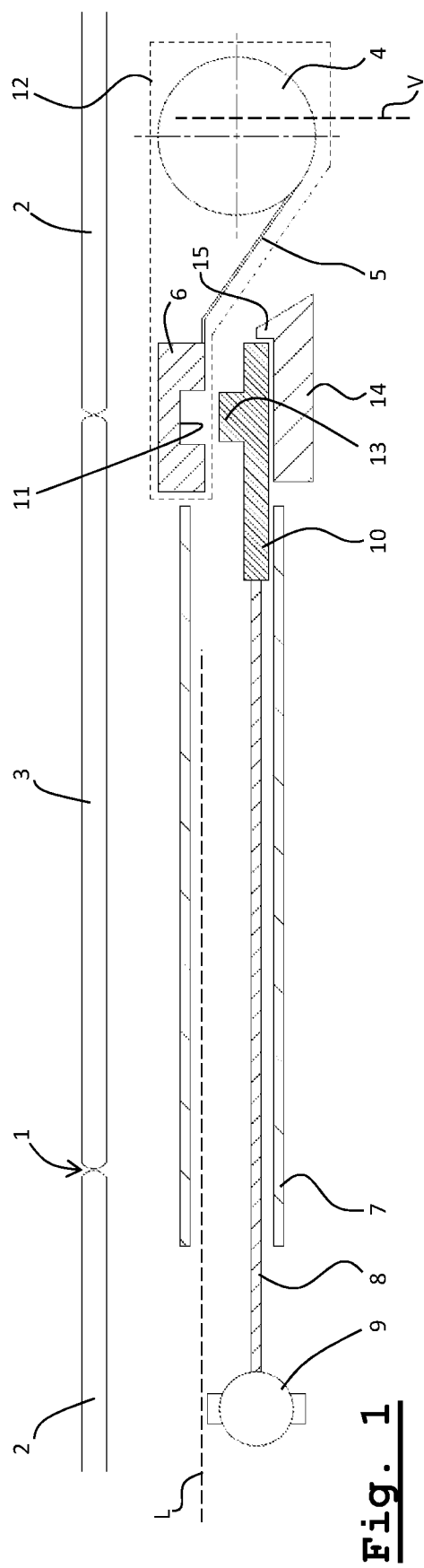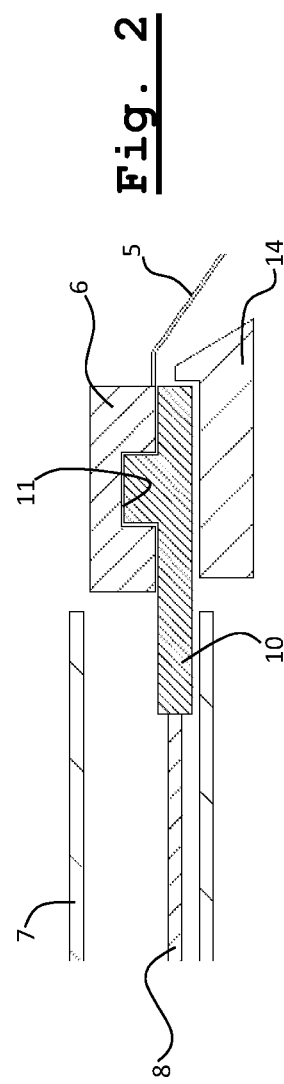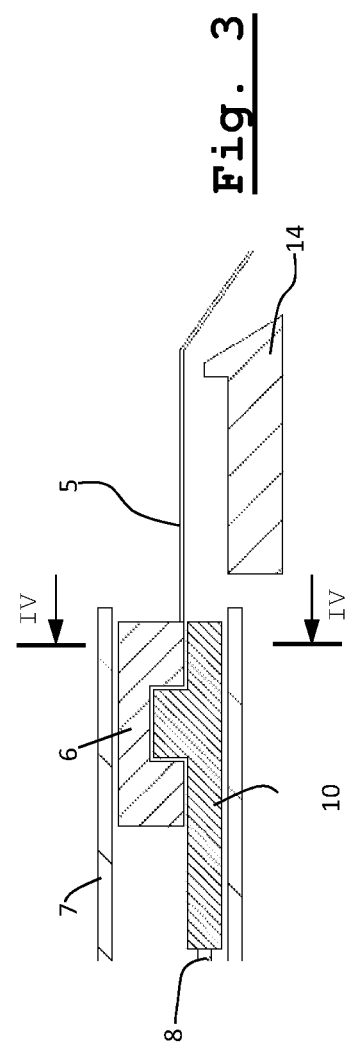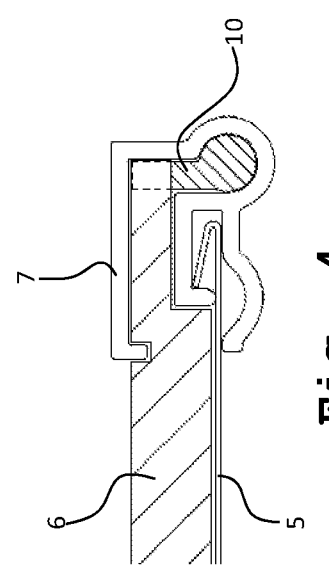

ROLLO ASSEMBLY AND OPEN ROOF CONSTRUCTION PROVIDED THEREWITH

BACKGROUND

The discussion below is merely provided for general back-ground information and is not intended to be used as an aid in determining the scope of the claimed subject matter.

The invention in a first aspect relates to a rollo or roller assembly intended for use in an open roof construction for a vehicle with a roof opening defined in a stationary roof part, comprising a rotatable winding shaft, a rollo screen of which a rear end can be wound on or off said winding shaft and of which an opposite forward end is provided with an operating beam. Opposite stationary guide channels in a longitudinal direction guide opposite side edges of the rollo screen and opposite ends of the operating beam. Drive cables extend in said guide channels and are provided with connecting members for drivingly engaging respective counter connecting members provided at opposite ends of the operating beam. The winding shaft, operating beam and rollo screen are combined into a detachable unit which, when the rollo screen is substantially fully wound onto the winding shaft and the drive cables assume a position in which the connecting members at least partially protrude from a longitudinal end of the guide channels facing the detachable unit, can be moved in a substantially vertical direction substantially perpendicularly to said longitudinal direction relative to said stationary guide channels for connecting or disconnecting the counter connecting members of the operating beam to or from the connecting members of the drive cables.

A rollo assembly of such a type for example is known from DE 10 2015 109 862 A1. When, in this known rollo assembly, the connecting members protrude from the guide channels, connecting the counter connecting members of the operating beam with the connecting members may prove difficult because the position and/or orientation of the connecting members (which then are mainly unsupported by the guide channels) may vary. One solution to this problem would be to prolong the guide channels while removing (for example milling away) an upper part thereof, such that the remaining lower part of the guide channel still supports the connecting member while offering access to the connecting member at the removed upper part of the guide channel. A drawback of such a solution, however, is the increased cost of material for the guide channels (which originally should be longer) and the increased manufacturing cost for removing (milling away) part of the guide channels.

SUMMARY

This Summary and Abstract are provided herein to introduce a selection of concepts in simplified form that are further described below in the Detailed Description. The Summary and Abstract are not intended to identify key features or essential features of the claimed subject matter, nor are they intended to be used as an aid in determining the scope of the claimed subject matter. The claimed subject matter is not limited to the implementations that solve any or all the disadvantages noted in the background.

An aspect of the present invention is a rollo assembly for use in a vehicle with an opening. The rollo assembly includes a shaft, a screen wound on/off said shaft where a forward end is provided with a beam and opposite channels guide edges of the screen and ends of the beam. Drive cables are provided with connecting members for drivingly engaging respective counter connecting members provided at ends of the beam. The shaft, beam and screen are combined into a detachable unit which, when the screen is substantially fully wound onto the shaft and the cables assume a position in which the connecting members at least partially protrude from a longitudinal end of the channels, can be moved relative to said channels for connecting or disconnecting the counter connecting members to or from the connecting members. A support maintains the connecting members of the cables, when maximally protruding from said longitudinal end of the channels, in a well-defined position.

The support, which is other than the guide channels, maintain the connecting members in a well-defined position, especially during a connection operation. The guide channels can simply be cut off to a desired length.

In one embodiment the support comprises at least one part of, preferably the stationary roof part of, the vehicle for supporting the connecting members in said vertical direction. For example, said at least one part of the vehicle may be a transverse beam which preferably defines part of the roof opening. Specifically said transverse beam may be a rear beam of the roof opening (in an embodiment in which the rotatable winding shaft is located behind the roof opening), but the use of, for example, a middle beam is conceivable too.

In another embodiment the support comprises abutment members for defining the longitudinal position of the connecting members when maximally protruding from said longitudinal end of the guide channels. For example, such abutment members may be provided on at least one part of, preferably the stationary roof part of, the vehicle, such as, for example, a transverse beam which preferably defines part of the roof opening. This again may be a rear beam of the roof opening.

In an alternative embodiment said abutment members are part of the guide channels. This, however, may increase the cost of the guide channels, which apart from being cut off to the desired length also should be provided with such abutment members.

In one embodiment of the rollo assembly each connecting member has such a length that, when maximally protruding from the guide channel, part of the connecting member still is housed in the respective guide channel and wherein said part of the connecting member and the guide channel define such a tight fit that a rotation of the connecting member around the longitudinal direction as defined by the respective drive cable is substantially prevented.

In such an embodiment also the guide channels play a role in maintaining the connecting members in a desired position and orientation, especially during a connecting operation.

When, in the position in which the connecting members at least partially protrude from the said longitudinal end of the guide channels, the counter connecting members of the operating beam have been connected with the connecting members, the connecting members have to be moved in the longitudinal direction for (further) entering the guide channels together with the ends of the operating beam and the rollo screen edges. When the connecting members have a stationary position with respect to the drive cables, such a longitudinal movement of the connecting members involves a longitudinal movement of the drive cables. However, during mounting the rollo assembly a movement of the drive cables generally would involve the activation of a drive mechanism, such as an electric motor, and in practice such an activation is not preferred at such a stage.

For avoiding such a situation, an embodiment is conceivable in which each connecting member in said longitudinal direction in a limited sense is slidable relative to the respective drive cable. Thus the connecting member together with the counter connecting member can be moved (further) into the guide channel while the drive cable is kept stationary.

It is possible, then, that the connecting member is directly slidably connected to the drive cable. For example, the connecting member may have a channel through which the drive cable runs.

In an alternative embodiment the drive cable carries a base member fixed thereto wherein the connecting member is defined by a slide member which can slide on said base member.

In a specific embodiment, then, the base member in a position in which the connecting member at least partially protrudes from a longitudinal end of the guide channel facing the detachable unit is housed completely within the guide channel without protruding from said longitudinal end.

Such an embodiment enables a mounting operation of the detachable unit in such a manner that, after the counter connecting member and connecting member are interconnected by an appropriate movement of the operating beam in a vertical direction (most commonly downward) and the connecting member has moved (further) into the guide channel, the winding shaft firstly is moved closer towards the guide channel (as allowed because the base member does not protrude therefrom) before also being moved in said vertical direction to its final position.

In one embodiment each connecting member defines a projecting member, whereas each counter connecting member of the operating beam defines a corresponding recess for receiving a connecting member.

In a second aspect the invention relates to an open roof construction for a vehicle, comprising a roof opening provided in a stationary roof part, a movable panel intended for closing and at least partially opening said roof opening and with a rollo assembly having one or more aspects of the present invention positioned below said roof opening.

BRIEF DESCRIPTION OF THE DRAWINGS

Hereinafter aspects of the invention will be elucidated while referring to the drawings, in which:

FIG. 1 in a schematic manner illustrates an embodiment of an open roof construction with rollo assembly in a longitudinal cross section and in a first position;

FIGS. 2 and 3 in a similar manner but at a slightly larger scale illustrate part of the open roof construction of FIG. 1, but in two different positions;

FIG. 4 illustrates a cross section according to IV-IV in FIG. 3;

DETAILED DESCRIPTION

Figure 5:
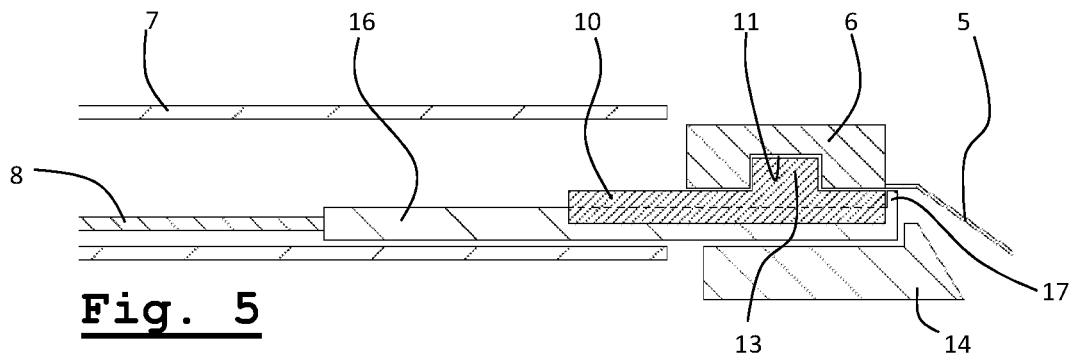
FIGS. 5-7 illustrate a different embodiment of the rollo assembly in three different positions.

In FIG. 1 a schematic representation is shown of an open roof construction with a rollo assembly, intended for use in a vehicle, with a roof opening 1 defined in a stationary roof part 2. A movable panel 3 is provided intended for closing and at least partially opening said roof opening 1 in a manner known per se. The rollo assembly comprises a rotatable winding shaft 4, a rollo screen 5 of which a rear end can be wound on or off said winding shaft and of which an opposite forward end is provided with an operating beam 6.

Further, opposite stationary guide channels 7 (only one of which is visible) are provided at opposite longitudinal sides of and below the roof opening 1 for in a longitudinal direction L guiding opposite side edges of the rollo screen 5 and opposite ends of the operating beam 6. Drive cables 8 driven by, for example, an electric motor 9 (or alternatively manually by a hand crank) extend in said guide channels 7 and are provided with connecting members 10 for drivingly engaging the operating beam 6 (more specifically counter connecting members 11 provided at opposite ends of the operating beam 6).

The winding shaft 4, operating beam 6 and rollo screen 5 are combined into a detachable unit 12 (schematically indicated by a broken line) which, when the rollo screen 5 is substantially fully wound onto the winding shaft 4 and the drive cables 8 assume a position in which the connecting members 10 at least partially protrude from a longitudinal (here rear) end of the guide channels 7 facing the detachable unit 12 (as represented in FIG. 1), can be moved in a substantially vertical direction V substantially perpendicularly to said longitudinal direction L relative to said stationary guide channels 7 for connecting or disconnecting the counter connecting members 11 of the operating beam 6 to or from the connecting members 10 of the drive cables 8.

In the embodiment according to FIG. 1 the connecting members 10 define projections 13, while the counter connecting members 11 are shaped as recesses for receiving said projections 13. However, the connecting members 10 likewise may define recesses while the counter connecting members 11 define projections. Also other mating members or provisions for connecting these parts are conceivable.

The rollo assembly further comprises a support for maintaining the connecting members 10 of the drive cables 8, when maximally protruding from said longitudinal end of the guide channels 7 as illustrated in FIG. 1, in a well-defined position. The support may comprise at least one part 14, preferably of the stationary roof part 2 of the vehicle for supporting the connecting members 10 in said vertical direction V. Said at least one part 14 of the vehicle can be a transverse beam (in the present embodiment a rear beam) which defines part of the (boundary of the) roof opening 1. But also, for example, a middle beam is conceivable.

The support further may comprise abutment members 15 for defining the longitudinal position of the connecting members 10 when maximally protruding from said longitudinal end of the guide channels 7 (FIG. 1). Such abutment members 15 may be provided on said at least one part 14 of the stationary roof part 2 of the vehicle, but it also is conceivable that these abutment members 15 are attached to, or are part of another part of the vehicle. For example, said abutment members also may be part of the guide channels 7.

As appears from FIG. 1, the connecting member 10 in the illustrated embodiment has such a length that, when maximally protruding from its guide channel 7, part of the connecting member still is housed in the respective guide channel 7. Further, referring to FIG. 4, said part of the connecting member 10 and the guide channel 7 define such a tight fit that a rotation of the connecting member around a longitudinal direction as defined by the respective drive cable 8 is substantially prevented.

Thus, the part 14, the abutment member 15 and the discussed tight fit between the connecting member 10 and guide channel 7 assure that the position and orientation of the connecting member 10 are maintained during a connecting operation as described below.

Starting from the position in FIG. 1 in which the connecting member 10 (more precisely its projection 13) is still disengaged from the counter connecting member (recess) 11 of the operating beam 6, the counter connecting member 11 is lowered to the position illustrated in FIG. 2. Next the connecting member 10, through a movement of the drive cable 8, is moved further into the guide channel 7, as illustrated in FIG. 3. The rollo assembly now is ready for use. The manner in which the detachable unit 12 is connected to the remainder of the rollo assembly is known per se and has not been illustrated.

In some situations, while mounting the detachable unit 12 to the remainder of the rollo assembly, one wishes to avoid the need of moving the drive cables 8 (either by an electric motor 9 or manually by a hand crank) for moving the connecting members 10 (further) into the guide channels 7. Thus an embodiment may be provided as illustrated in FIGS. 5-7 which show consecutive positions thereof during a connecting operation.

In this embodiment each connecting member 10 in a limited sense is slidable in the longitudinal direction L relative to the respective drive cable 8. As illustrated, the drive cable 8 carries a base member 16 fixed thereto and the connecting member 10 is shaped as a slide member which can slide on said base member 16. The base member 16 comprises a stop 17 which defines the outermost (rearmost) position of the connecting member 10 as illustrated in FIG. 5. In this position the connecting operation has started and has proceeded until the connecting member 10 (or its projection 13) and counter connecting member (recess) 11 of the operating beam 6 have been engaged.

Figure 6:
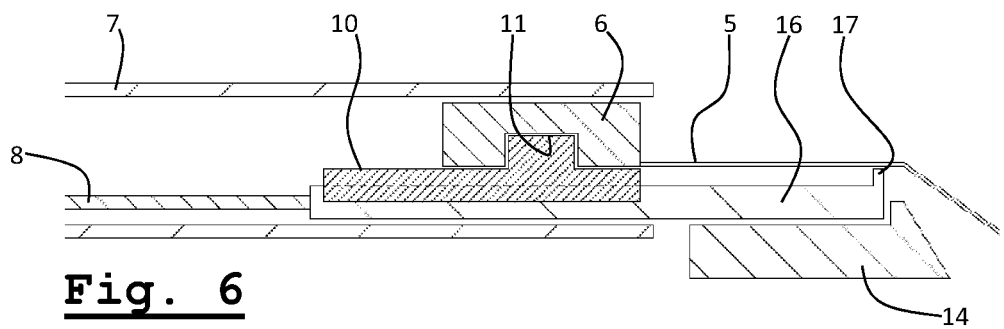

Next the connecting member (slide) 10 is slid over the base member 16 in a direction (further) into the guide channel 7 without moving the drive cable (FIG. 6). Thus any activation of the drive cable 8 can be avoided at this stage.

Figure 7:
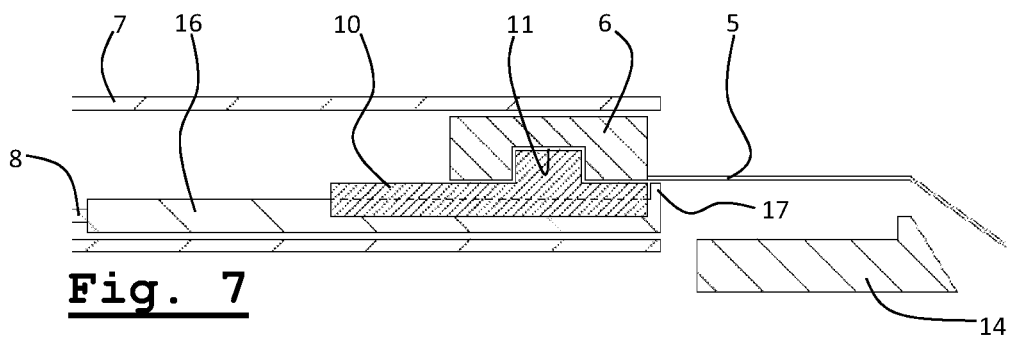

Starting from the position in FIG. 6, in which the connecting member has fully entered the guide channel 7, a movement of the drive cable 8 to the left will lead to the situation illustrated in FIG. 7 in which the stop 17 again engages the connecting member 10, such that latter will move along with the drive cable for an operation of the rollo assembly (that is, a movement of the rollo screen 5).

In some instances, the winding shaft 4 will be spring-loaded for winding on the rollo screen 5 and as a result the connecting member 10 will be kept in engagement with the stop 17 during a movement of the drive cable 8 and the rollo screen 5.

Figure 8:
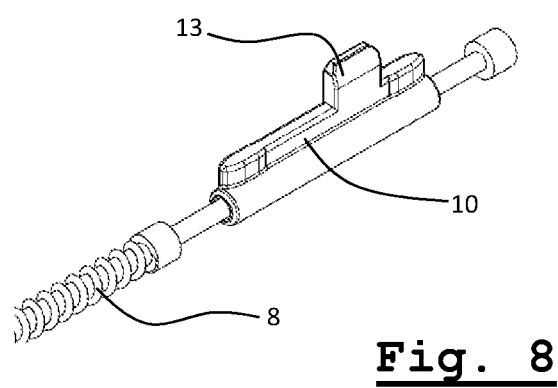
FIG. 8 in a perspective view illustrates a detail of yet another embodiment of the rollo assembly.

In FIG. 8 an alternative embodiment is illustrated in which the connecting member 10 is directly slidably connected to/mounted on the drive cable 8 without the use of a base member.

Figure 9:
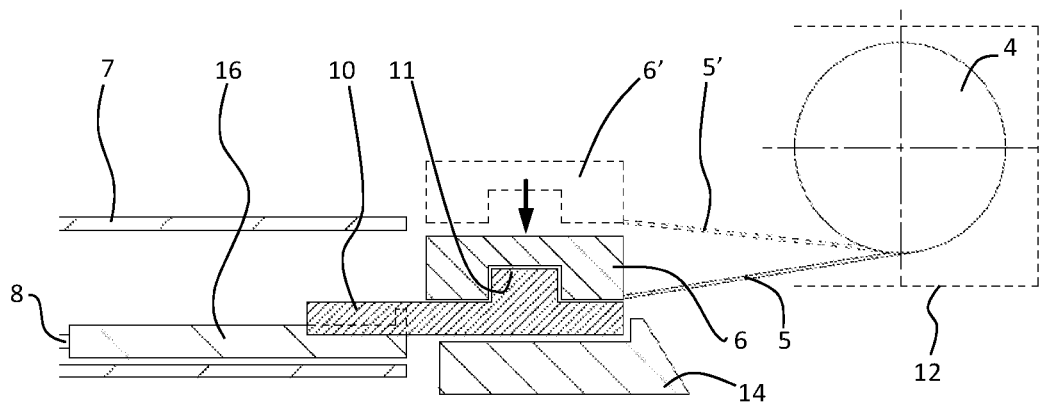
FIGS. 9-11 illustrate yet a different embodiment of the rollo assembly in three different positions.
Figure 10:
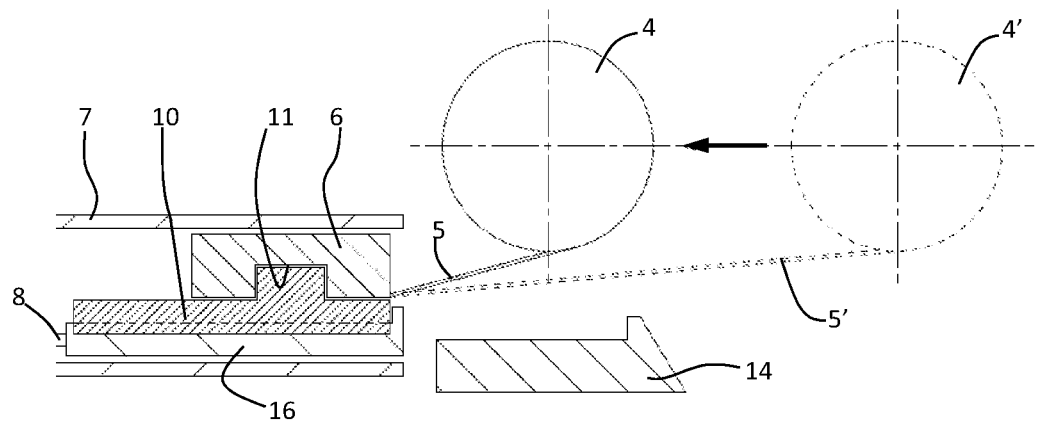
Figure 11:
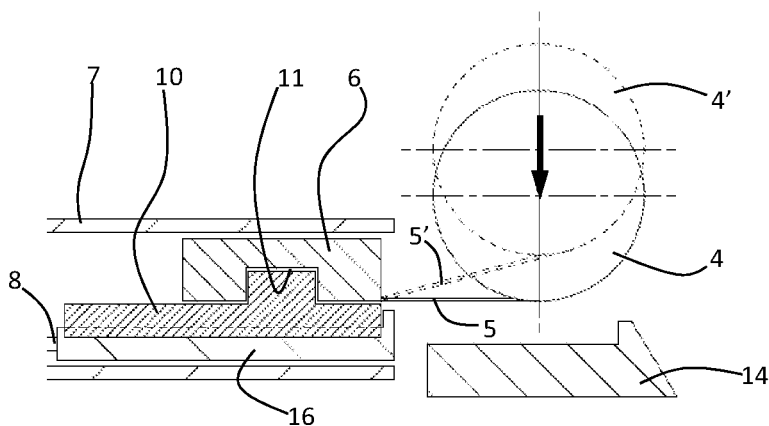

Finally referring to FIGS. 9-11, yet another embodiment is illustrated which also shows a connecting member 10 which is slidable on a base member 16. However, in this particular embodiment the base member 16 in a position in which the connecting member 10 at least partially protrudes from a longitudinal end of the guide channel 7 facing the detachable unit 12 (as illustrated in FIG. 9) is housed completely within the guide channel without protruding from said longitudinal end. Such an embodiment allows to mount the detachable unit in the following manner: firstly, the operating beam 6 (which, as discussed above, is provided with the counter connecting members 11) is lowered such that its counter connecting members 11 engage the connecting members 10 (as represented in FIG. 9 as a movement from position 6' to position 6). The winding shaft 4 is kept stationary (this basically may apply for other parts of the unit 12 too, however with the exception of the operating beam 6). Next the connecting member 10 is slid over the base member 16 into the guide channel 7 (reaching the position indicated in FIG. 10), where after the winding shaft 4 is moved towards the guide channel 7 (as represented in FIG. 10 as the movement from position 4' to position 4). Finally, the winding shaft is lowered to its final position (movement from position 4' to position 4 in FIG. 11). After the winding shaft 4 (or the detachable unit 12) is fixed in this final position, the rollo assembly is ready for use, meaning that the base member 16 can move to the left, which eventually will lead to a corresponding movement of the connecting member 10 and thus, via the counter connecting member 11 of the operating beam 6, of the rollo screen 5.

The invention is not limited to the embodiments described before which may be varied widely within the scope of the invention as defined by the appending claims. Thus it will be clear that the part supporting the connecting member also may be part of another vehicle part and is not limited to being part of the stationary roof part.

What is claimed is:

1. A rollo assembly for use in an open roof construction for a vehicle with a roof opening defined in a stationary roof part, the rollo assembly comprising:
    a rotatable winding shaft;
    a rollo screen having a forward end and an opposite rear end of which the rear end is wound on or off said winding shaft;
    an operating beam joined to the forward end and having counter connecting members provided at opposite ends of the operating beam;
    opposite stationary guide channels configured to guide in a longitudinal direction opposite side edges of the rollo screen and opposite ends of the operating beam;
    drive cables extending in said guide channels and provided with connecting members, wherein the winding shaft, operating beam and rollo screen are combined into a detachable unit which, when the rollo screen is substantially fully wound onto the winding shaft and the drive cables assume a position in which the connecting members at least partially protrude from a longitudinal end of the guide channels facing the detachable unit, each connecting member and each respective counter connecting member having complementary engaging surfaces that are configured so that connection and disconnection is made during mounting of the rollo assembly in a substantially vertical direction substantially perpendicularly to said longitudinal direction relative to said stationary guide channels, wherein the complementary engaging surfaces are configured to drive the counter connecting members with longitudinal movement of the respective connecting member; and
    a support configured to maintain the connecting members of the drive cables, when maximally protruding from said longitudinal end of the guide channels, in a well-defined position prior to connection of each connecting member and each respective counter connecting member during mounting of the rollo assembly in the substantially vertical direction.

2. The rollo assembly according to claim 1, wherein the support comprises at least one part of the stationary roof part of the vehicle for supporting the connecting members in said vertical direction.

3. The rollo assembly according to claim 2, wherein said at least one part of the stationary roof part of the vehicle is a transverse beam which defines part of the roof opening.

4. The rollo assembly according to claim 3, wherein said transverse beam is a rear beam of the roof opening.

5. The rollo assembly according to claim 1, wherein the support comprises abutment members configured to define a longitudinal position of the connecting members when maximally protruding from said longitudinal end of the guide channels.

6. The rollo assembly according to claim 5, wherein said abutment members are provided on at least one part of the stationary roof part of the vehicle.

7. The rollo assembly according to claim 6, wherein said at least one part of the stationary roof part of the vehicle is a transverse beam which defines part of the roof opening and is a rear beam of the roof opening.

8. The rollo assembly according to claim 5, wherein said abutment members are part of the guide channels.

9. The rollo assembly according to claim 1, wherein each connecting member has such a length that, when maximally protruding from each respective guide channel, part of the connecting member still is housed in the respective guide channel and wherein said part of the connecting member and the guide channel define such a tight fit that a rotation of the connecting member around the longitudinal direction as defined by the respective drive cable is substantially prevented.

10. The rollo assembly according to claim 1, wherein each connecting member in said longitudinal direction in a limited sense is slidable relative to the respective drive cable.

11. The rollo assembly according to claim 10, wherein the connecting member is directly slidably connected to the drive cable.

12. The rollo assembly according to claim 10, wherein the drive cable carries a base member fixed thereto and wherein the connecting member is defined by a slide member which slides on said base member.

13. The rollo assembly according to claim 12, wherein the base member in a position in which the connecting member at least partially protrudes from a longitudinal end of the guide channel facing the detachable unit is housed completely within the guide channel without protruding from said longitudinal end.

14. The rollo assembly according to claim 1, wherein each connecting member defines a projecting member, whereas each counter connecting member of the operating beam defines a corresponding recess for receiving a connecting member.

15. An open roof construction for a vehicle, comprising:
a roof opening provided in a stationary roof part;
a movable panel configured to close and at least partially open said roof opening and with a rollo assembly comprising:
a rotatable winding shaft;
a rollo screen having a forward end and an opposite rear end of which the rear end is wound on or off said winding shaft;
an operating beam joined to the forward end and having counter connecting members provided at opposite ends of the operating beam;
opposite stationary guide channels configured to guide in a longitudinal direction opposite side edges of the rollo screen and opposite ends of the operating beam;
drive cables extending in said guide channels and provided with connecting members configured to drivingly engage each respective counter connecting member in the longitudinal direction, wherein the winding shaft, operating beam and rollo screen are combined into a detachable unit which, when the rollo screen is substantially fully wound onto the winding shaft and the drive cables assume a position in which the connecting members at least partially protrude from a longitudinal end of the guide channels facing the detachable unit, each connecting member and each respective counter connecting member configured to be connected and disconnected with movement of the rollo assembly in a substantially vertical direction substantially perpendicularly to said longitudinal direction relative to said stationary guide channels; and
a support configured to maintain the connecting members of the drive cables, when maximally protruding from said longitudinal end of the guide channels, in a well-defined position prior to connection of each connecting member and each respective counter connecting member during mounting of the rollo assembly in the substantially vertical direction.

16. The open roof construction according to claim 15, wherein the support comprises at least one part of the stationary roof part of the vehicle for supporting the connecting members in said vertical direction.

17. The open roof construction according to claim 16, wherein said at least one part of the vehicle is a transverse beam which defines part of the roof opening.

18. The open roof construction according to claim 15, wherein each connecting member has such a length that, when maximally protruding from the respective guide channel, part of the connecting member still is housed in the respective guide channel and wherein said part of the connecting member and the guide channel define such a tight fit that a rotation of the connecting member around the longitudinal direction as defined by the respective drive cable is substantially prevented.

19. The open roof construction according to claim 15, wherein each connecting member in said longitudinal direction in a limited sense is slidable relative to the respective drive cable.

20. The open roof construction according to claim 15, wherein each connecting member defines a projecting member, whereas each counter connecting member of the operating beam defines a corresponding recess for receiving a connecting member.

21. The rollo assembly according to claim 5, wherein said abutment members are part of the stationary roof part.

* * * * *